United States Patent
Liebold et al.

(10) Patent No.: US 10,696,121 B2
(45) Date of Patent: Jun. 30, 2020

(54) METHOD AND CONTROL DEVICE FOR ADJUSTING THE DAMPING FORCE OF A SHOCK ABSORBER

(71) Applicant: Dr. Ing. h.c. F. Porsche Aktiengesellschaft, Stuttgart (DE)

(72) Inventors: Jochen Liebold, Stuttgart (DE); David Caredda, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 379 days.

(21) Appl. No.: 15/825,582

(22) Filed: Nov. 29, 2017

(65) Prior Publication Data

US 2018/0154731 A1 Jun. 7, 2018

(30) Foreign Application Priority Data

Dec. 5, 2016 (DE) .................. 10 2016 123 421

(51) Int. Cl.
*B60G 17/06* (2006.01)

(52) U.S. Cl.
CPC ...... *B60G 17/06* (2013.01); *B60G 2400/0511* (2013.01); *B60G 2400/0512* (2013.01); *B60G 2400/252* (2013.01)

(58) Field of Classification Search
CPC .. B60G 17/06; B60G 17/018; B60G 17/0182; B60G 2400/0511; B60G 2400/0512; B60G 2400/252; B60G 2800/70; B60G 2500/10
See application file for complete search history.

(56) References Cited

U.S. PATENT DOCUMENTS

| 5,488,562 | A | 1/1996 | Otterbein et al. |
| 7,672,766 | B2 * | 3/2010 | Poilbout ............... B60G 3/04 701/37 |

(Continued)

FOREIGN PATENT DOCUMENTS

| DE | 4117897 A1 | 12/1992 |
| DE | 10318110 A1 | 11/2004 |

OTHER PUBLICATIONS

German Search Report for German Application No. 10 2016 123 421.4, dated Aug. 10, 2017, with partial English translation—7 Pages.

*Primary Examiner* — Michael J Zanelli
(74) *Attorney, Agent, or Firm* — RatnerPrestia

(57) ABSTRACT

Method for adjusting the damping force of shock absorbers connected between a vehicle body and a wheel at vehicle corners of a motor vehicle, wherein at least one damping force ($F_{LIFT}$, $F_{PITCH}$, $F_{ROLL}$) which is referred to a center of gravity of the vehicle body and is divided between axles of the vehicle and between the shock absorbers of the axles is determined as a function of at least one variable which represents a movement of the vehicle body and/or a movement of the respective wheel. For at least one of the damping forces which are referred to the center of gravity of the vehicle body, at least one division factor for the division of the damping forces is calculated between a front axle and a rear axle, and the division of the respective damping force ($F_{LIFT}$, $F_{PITCH}$, $F_{ROLL}$) is adapted on the basis of this division factor.

12 Claims, 1 Drawing Sheet

(56) References Cited

U.S. PATENT DOCUMENTS

| | | |
|---|---|---|
| 2002/0143448 A1 | 10/2002 | Shal et al. |
| 2004/0212159 A1 | 10/2004 | Stiller |
| 2009/0043451 A1 | 2/2009 | Harder et al. |
| 2009/0248247 A1 | 10/2009 | Furuichi et al. |
| 2013/0231833 A1 | 9/2013 | Shiozawa et al. |

* cited by examiner

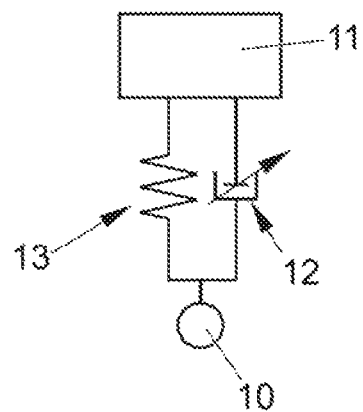

METHOD AND CONTROL DEVICE FOR ADJUSTING THE DAMPING FORCE OF A SHOCK ABSORBER

CROSS-REFERENCE TO RELATED APPLICATIONS

This application claims priority to German Patent Application No. DE 10 2016 123 421.4, filed Dec. 5, 2016, which is incorporated by reference herein in its entirety.

FIELD OF THE INVENTION

The invention relates to a method for adjusting the damping force of at least one shock absorber connected between a vehicle body and a wheel of a motor vehicle. Furthermore, the invention relates to a control device for executing the method.

BACKGROUND OF THE INVENTION

Methods for adjusting the damping force of shock absorbers of a motor vehicle are sufficiently known from practice. For example, according to the Skyhook principle the adjustment of the damping force for a shock absorber, connected between a vehicle body and a wheel, of a motor vehicle takes place in such a way that a damping force for the respective shock absorber is determined as a function of a movement of the vehicle body and/or as a function of a movement of the respective wheel and is set, specifically within a defined actuation range.

In this context, according to practice, damping forces or damping torques at the center of gravity of the motor vehicle are calculated for the lifting, pitching and rolling modal directions of movement. Damping torques can be converted into damping forces. The damping forces which are calculated for the modal directions of movement lifting, pitching and rolling and are referred to the center of gravity of the motor vehicle are distributed between the axles of the motor vehicle and between the vehicle corners and therefore between the individual wheels and summed. The distribution of the damping forces which are referred to the center of gravity of the motor vehicle between the axles and the vehicle corners is carried out here on the basis of permanently predefined parameters.

US 2009/0043451 A1, which is incorporated by reference herein, US 2009/0248247 A1, which is incorporated by reference herein, and US 2013/0231838, which is incorporated by reference herein, disclose determining a damping force on the basis of the speed or acceleration of the vehicle body.

US 2002/0143448 A1, which is incorporated by reference herein, discloses a method in which a variable damping force can be determined for the individual axles of the motor vehicle by a sensor making available at least one axle speed signal, wherein an axle control algorithm is applied to the axle speed signal, and axle damping is determined as a function of the axle control algorithm.

SUMMARY OF THE INVENTION

Described herein is a method for adjusting the damping force for shock absorbers of a motor vehicle, and to provide a control device for executing the method, which can be used to improve the quality of the damping.

According to aspects of the invention, for at least one of the damping forces which are referred to the center of gravity of the vehicle body, at least one division factor for the division of said damping forces is calculated between a front axle and a rear axle, and the division of the respective damping force is adapted on the basis of this division factor.

With the invention present here, a completely novel method is proposed for dividing a damping force between the axles of the motor vehicle according to the Skyhook principle, and in this way ultimately distributing it between the individual wheels of the axles.

In this context, division factors are preferably calculated continuously and used to distribute the damping forces of the modal directions between the front axle and the rear axle. In this way, different vehicle configurations and operating states of a motor vehicle can be taken into account in a particularly advantageous way during the determination of the damping force for the individual shock absorbers of the motor vehicle, in order thereby to improve the quality of the damping.

For all the damping forces referred to the center of gravity of the vehicle body, of the lifting, pitching and rolling modal directions, in each case at least one division factor for the division of the respective damping force between the front axle and the rear axle is preferably calculated, and the division of each damping force is adapted on the basis of this division factor. The calculation of division factors for all the modal directions is particularly preferable, in order to increase the quality of damping.

According to one development, the or each division factor for the lifting modal direction is calculated as a function of the spring stiffnesses of the front axle and of the rear axle, of a mass which loads the front axle and of a mass which loads the rear axle, and/or the or each division factor for the pitching modal direction is calculated as a function of pitching-spring stiffnesses of the front axle and of the rear axle, of a pitching moment of mass inertia which loads the front axle, and of a pitching moment of mass inertia which loads the rear axle, and/or the or each division factor for the rolling modal direction is calculated as a function of rolling-spring stiffnesses of the front axle and of the rear axle, of a rolling moment of mass inertia which loads the front axle and of a rolling moment of mass inertia which loads the rear axle.

The spring stiffnesses, masses and moments of inertia which are required to determine the division factors are either stored as fixed values on the control side or are determined on the basis of measurement variables and characteristic diagrams on the control side.

BRIEF DESCRIPTION OF THE DRAWINGS

Preferred developments of the invention can be found in the claims and the following description. Exemplary embodiments of the invention are explained in more detail with reference to the drawing without being restricted thereto.

In said drawing:

FIG. 1 shows a detail of a motor vehicle.

DETAILED DESCRIPTION OF THE INVENTION

FIG. 1 shows, as a quarter vehicle model of a motor vehicle, a highly schematic detail of a motor vehicle in the region of a wheel 10 of the motor vehicle and of a vehicle body 11 thereof, wherein according to FIG. 1 both a shock absorber 12 and a spring element 13 are connected between the vehicle body 11 and the wheel 10. According to FIG. 1, the damping force of the shock absorber 12 which is connected between the wheel 10 and the vehicle body 11 can be adjusted.

In order to adjust the damping force, which is made available by the shock absorber 12, a damping force is determined, in particular by a control device of the motor vehicle, specifically as a function of at least one variable which represents a movement of the vehicle body 11 and/or as a function of at least one variable which represents a movement of the respective wheel 10.

Then, if the damping force is adjusted according to the so-called Skyhook principle, a corresponding controller of the control device determines a damping force as a function of at least one variable which represents the movement of the vehicle body 11 and/or as a function of at least one variable which represents a movement of the respective wheel, specifically for a plurality of modal directions of movement of the vehicle body 11, specifically for modal lifting of the vehicle body 11, modal pitching of the vehicle body 11 and modal rolling of the vehicle body 11. This damping force is firstly referred to the center of gravity of the vehicle body 11 or of the motor vehicle and has to be divided between the axles and edges.

Using a controller to carry out the basic determination, in particular according to the Skyhook method, of a setpoint damping force which is referred to the center of gravity of the vehicle body 11 or motor vehicle is basically known to the person skilled in the art in question here.

At this point, for the sake of completeness, reference will be made to the fact that in Skyhook methods which are known from the prior art for the lifting, pitching and rolling modal directions of movement, corresponding damping forces $F_{LIFT}$, $F_{PITCH}$ and $F_{ROLL}$ as well as translatory modal speeds $v_{LIFT}$, $v_{PITCH}$ and $v_{ROLL}$ are calculated taking into account the following equations:

$$F_{LIFT}=2D_{LIFT}\sqrt{c_{LIFT}m}z, v_{LIFT}=z,$$

$$M_{PITCH}=2D_{PITCH}\sqrt{c_{PITCH}J_{PITCH}}\varphi, F_{PITCH}=f(M_{PITCH}), v_{PITCH}=f(\varphi),$$

$$M_{ROLL}=2D_{ROLL}\sqrt{c_{ROLL}J_{ROLL}}\Theta, F_{ROLL}=f(M_{ROLL}), v_{ROLL}=f(\Theta).$$

According to the prior art, these damping forces $F_{LIFT}$, $F_{PITCH}$ and $F_{ROLL}$ at the center of gravity of the motor vehicle are calculated and divided by way of permanently to predefined factors between the individual vehicle corners of the motor vehicle and therefore the individual wheels of the motor vehicle, and for each vehicle corner are summed to form a total damping force for the respective vehicle corner.

The damping forces $F_{LIFT}$, $F_{PITCH}$, $F_{ROLL}$ calculated at the center of gravity of the motor vehicle are divided between the front axle and the rear axle of the motor vehicle on the basis of calculated division factors. In this context, for at least one of the damping forces which are referred to the center of gravity of the vehicle body, preferably for all of the damping forces $F_{LIFT}$, $F_{PITCH}$, $F_{ROLL}$, which are referred to the center of gravity of the vehicle body, of the lifting, pitching and rolling modal directions, in each case at least one division factor is calculated for the division of the respective damping force between the front axle and the rear axle, wherein the division of the damping force which is referred to the center of gravity is adapted to the front axle and the rear axle on the basis of the or each division factor. Depending on the lifting, pitching and rolling modal direction, two division factors are preferably determined, specifically a division factor for dividing the respective damping force, which is referred to the center of gravity, for the front axle, and a division factor of the respective damping force, which is referred to the center of gravity, for the rear axle. The division factors are calculated here as a function of spring stiffnesses of the front axle, of spring stiffnesses of the rear axle, of a mass which loads the front axle, of a mass which loads the rear axle, of a mass inertia which loads the front axle and of a mass inertia which loads the rear axle.

The damping forces, divided between the front axle and the rear axle, of the modal directions are divided between the wheels and therefore between the shock absorbers positioned on the wheels, and to be precise in the region of the front axle and in the region of the rear axle, in particular in each case halfway or approximately halfway between the respective wheels and therefore the respective shock absorbers on the respective axle. The division of the damping forces which are divided between the axles between the wheels of the axle and therefore between individual shock absorbers can also be carried out in a different way.

The lifting-spring stiffness of the front axle and the lifting-spring stiffness of the rear axle are either stored as a fixed value on the control side or can be determined as a function of a characteristic curve.

A lifting-spring stiffness for a steel spring is stored as a fixed value. A lifting-spring stiffness for an air spring is determined as a function of a characteristic curve. The same applies to pitching-spring stiffnesses and rolling-spring stiffnesses of the front axle and of the rear axle.

The mass which loads the front axle and the mass which loads the rear axle can be sensed using a sensor. Likewise, it is possible for the mass which loads the front axle and the mass which loads the rear axle to be calculated on the control side. The respective pitching moment of mass inertia and the respective rolling moment of mass inertia can be scaled as a function of the mass which loads the front axle and as a function of the mass which loads the rear axle, in particular as a function of the so-called Steiner's theorem which is known to the relevant person skilled in the art.

Division factors for the lifting modal direction are preferably calculated as follows:

$$\alpha_{FA\text{-}LIFT} = \frac{\sqrt{c_{FA\text{-}LIFT}m_{FA}}}{\sqrt{c_{FA\text{-}LIFT}m_{FA}} + \sqrt{c_{RA\text{-}LIFT}m_{RA}}},$$

$$\alpha_{RA\text{-}LIFT} = \frac{\sqrt{c_{RA\text{-}LIFT}m_{RA}}}{\sqrt{c_{FA\text{-}LIFT}m_{FA}} + \sqrt{c_{RA\text{-}LIFT}m_{RA}}},$$

where $\alpha_{FA\text{-}LIFT}$ is the division factor for the front axle for the lifting modal direction, $\alpha_{RA\text{-}LIFT}$ is the division factor for the rear axle for the lifting modal direction, $C_{FA\text{-}LIFT}$ is the lifting-spring stiffness of the front axle, $C_{RA\text{-}LIFT}$ is the lifting-spring stiffness of the rear axle, $m_{FA}$ is the mass which loads the front axle, and $m_{RA}$ is the mass which loads the rear axle.

The division factors for the lifting modal direction are preferably determined in such a way that the following applies:

$$\alpha_{FA\text{-}LIFT}+\alpha_{RA\text{-}LIFT}=1.$$

Division factors for the pitching modal direction are preferably calculated as follows:

$$\alpha_{FA\text{-}PITCH} = \frac{\sqrt{c_{FA\text{-}PITCH} J_{FA\text{-}PITCH}}}{\sqrt{c_{FA\text{-}PITCH} J_{FA\text{-}PITCH}} + \sqrt{c_{RA\text{-}PITCH} J_{RA\text{-}PITCH}}},$$

$$\alpha_{RA\text{-}PITCH} = \frac{\sqrt{c_{RA\text{-}PITCH} J_{RA\text{-}PITCH}}}{\sqrt{c_{FA\text{-}PITCH} J_{FA\text{-}PITCH}} + \sqrt{c_{RA\text{-}PITCH} J_{RA\text{-}PITCH}}},$$

where $\alpha_{FA\text{-}PITCH}$ is the division factor for the front axle for the pitching modal direction, $\alpha_{RA\text{-}PITCH}$ is the division factor for the rear axle for the pitching modal direction, $C_{FA\text{-}PITCH}$ is the pitching-spring stiffness of the front axle, $C_{RA\text{-}PITCH}$ is the pitching-spring stiffness of the rear axle, $J_{FA\text{-}PITCH}$ is the pitching moment of mass inertia which loads the front axle, and $J_{RA\text{-}PITCH}$ is the pitching moment of mass inertia which loads the rear axle.

The division factors for the pitching modal direction are preferably determined in such a way that the following applies:

$\alpha_{FA\text{-}PITCH} + \alpha_{RA\text{-}PITCH} = 1$.

Division factors for the rolling modal direction are preferably calculated as follows:

$$\alpha_{FA\text{-}ROLL} = \frac{\sqrt{c_{FA\text{-}ROLL} J_{FA\text{-}ROLL}}}{\sqrt{c_{FA\text{-}ROLL} J_{FA\text{-}ROLL}} + \sqrt{c_{RA\text{-}ROLL} J_{RA\text{-}ROLL}}},$$

$$\alpha_{RA\text{-}ROLL} = \frac{\sqrt{c_{RA\text{-}ROLL} J_{RA\text{-}ROLL}}}{\sqrt{c_{FA\text{-}ROLL} J_{FA\text{-}ROLL}} + \sqrt{c_{RA\text{-}ROLL} J_{RA\text{-}ROLL}}},$$

where $\alpha_{FA\text{-}ROLL}$ is the division factor for the front axle for the rolling modal direction, $\alpha_{RA\text{-}ROLL}$ is the division factor for the rear axle for the rolling modal direction, $C_{FA\text{-}ROLL}$ is the rolling-spring stiffness of the front axle, $C_{RA\text{-}ROLL}$ is the rolling-spring stiffness of the rear axle, $J_{FA\text{-}ROLL}$ is the rolling moment of mass inertia which loads the front axle, and $J_{RA\text{-}ROLL}$ is the rolling moment of mass inertia which loads the rear axle.

The division factors for the rolling modal direction are preferably determined in such a way that the following applies:

$\alpha_{FA\text{-}ROLL} + \alpha_{RA\text{-}ROLL} = 1$.

The present invention here also relates to a control device for executing the method according to aspects of the invention.

The control device comprises means for executing the method according to aspects of the invention on the control side. These means include hardware means and software means. The hardware means include data interfaces for exchanging data with the assemblies, for example with sensors and shock absorbers, which are involved in the execution of the method according to aspects of the invention. In addition, the hardware means include a processor for processing data and a memory for storing data. The software means include program modules for executing the method.

The division factors are calculated constantly or continuously, and likewise the adaptation of the division of the respective damping force on the basis of the division factors is carried out constantly or continuously.

What is claimed is:

1. A method for adjusting a damping force of shock absorbers connected between a vehicle body and a wheel at vehicle corners of a motor vehicle, comprising the steps of:

determining at least one damping force ($F_{LIFT}$, $F_{PITCH}$, $F_{ROLL}$), which is referred to a center of gravity of the vehicle body and is divided between axles of the motor vehicle and between shock absorbers of the axles as a function of at least one variable which represents a movement of the vehicle body or a movement of the respective wheel, calculating, for at least one of the damping forces which are referred to the center of gravity of the vehicle body, at least one division factor for the division of said damping forces between a front axle and a rear axle of the motor vehicle, and adjusting the division of the respective damping force ($F_{LIFT}$, $F_{PITCH}$, $F_{ROLL}$) on the basis of the at least one division factor, wherein the at least one division factor is calculated as a function of a lifting-spring stiffness of the front axle, a lifting-spring stiffness of the rear axle, a mass which loads the front axle and a mass which loads the rear axle.

2. The method as claimed in claim 1, wherein, for all the damping forces referred to the center of gravity of the vehicle body, of lifting, pitching and rolling modal directions ($F_{LIFT}$, $F_{PITCH}$, $F_{ROLL}$), the method further comprises, in each case, calculating at least one division factor for the division of the respective damping force between the front axle and the rear axle, and adjusting the division of each damping force ($F_{LIFT}$, $F_{PITCH}$, $F_{ROLL}$) on the basis of the division factor.

3. The method as claimed in claim 2, wherein the or each division factor for the lifting modal direction is calculated as a function of the lifting-spring stiffness of the front axle, the lifting-spring stiffness of the rear axle, the mass which loads the front axle and the mass which loads the rear axle.

4. The method as claimed in claim 3, wherein division factors for the lifting modal direction are calculated as follows:

$$\alpha_{FA\text{-}LIFT} = \frac{\sqrt{c_{FA\text{-}LIFT} m_{FA}}}{\sqrt{c_{FA\text{-}LIFT} m_{FA}} + \sqrt{c_{RA\text{-}LIFT} m_{RA}}},$$

$$\alpha_{RA\text{-}LIFT} = \frac{\sqrt{c_{RA\text{-}LIFT} m_{RA}}}{\sqrt{c_{FA\text{-}LIFT} m_{FA}} + \sqrt{c_{RA\text{-}LIFT} m_{RA}}},$$

where $\alpha_{FA\text{-}LIFT}$ is the division factor for the front axle for the lifting modal direction, $\alpha_{RA\text{-}LIFT}$ is the division factor for the rear axle for the lifting modal direction, $C_{FA\text{-}LIFT}$ is the lifting-spring stiffness of the front axle, $C_{RA\text{-}LIFT}$ is the lifting-spring stiffness of the rear axle, $m_{FA}$ is the mass which loads the front axle, and $m_{RA}$ is the mass which loads the rear axle.

5. The method as claimed in claim 2, wherein the or each division factor for the pitching modal direction is calculated as a function of a pitching-spring stiffness of the front axle, a pitching-spring stiffness of the rear axle, a pitching-moment of mass inertia which loads the front axle and a pitching-moment of mass inertia which loads the rear axle.

6. The method as claimed in claim 5, wherein division factors for the pitching modal direction are calculated as follows:

$$\alpha_{FA\text{-}PITCH} = \frac{\sqrt{c_{FA\text{-}PITCH} J_{FA\text{-}PITCH}}}{\sqrt{c_{FA\text{-}PITCH} J_{FA\text{-}PITCH}} + \sqrt{c_{RA\text{-}PITCH} J_{RA\text{-}PITCH}}},$$

$$\alpha_{RA\text{-}PITCH} = \frac{\sqrt{c_{RA\text{-}PITCH} J_{RA\text{-}PITCH}}}{\sqrt{c_{FA\text{-}PITCH} J_{FA\text{-}PITCH}} + \sqrt{c_{RA\text{-}PITCH} J_{RA\text{-}PITCH}}},$$

where $\alpha_{FA\text{-}PITCH}$ is the division factor for the front axle for the pitching modal direction, $\alpha_{RA\text{-}PITCH}$ is the division factor for the rear axle for the pitching modal direction, $C_{FA\text{-}PITCH}$ is the pitching-spring stiffness of the front axle, $C_{RA\text{-}PITCH}$ is the pitching-spring stiffness of the rear axle, $J_{FA\text{-}PITCH}$ is the pitching moment of mass inertia which loads the front axle, and $J_{RA\text{-}PITCH}$ is the pitching moment of mass inertia which loads the rear axle.

7. The method as claimed in claim 2, wherein division factors for the lifting, pitching, rolling modal directions are determined, in that the following applies:

$\alpha_{FA\text{-}LIFT} + \alpha_{RA\text{-}LIFT} = 1$, or $\alpha_{FA\text{-}PITCH} + \alpha_{RA\text{-}PITCH} = 1$, or $\alpha_{FA\text{-}ROLL} + \alpha_{RA\text{-}ROLL} = 1$, and where $\alpha_{FA\text{-}LIFT}$ is the division factor for the front axle for the lifting modal direction, $\alpha_{RA\text{-}LIFT}$ is the division factor for the rear axle for the lifting modal direction, $\alpha_{FA\text{-}PITCH}$ is the division factor for the front axle for the pitching modal direction, $\alpha_{RA\text{-}PITCH}$ is the division factor for the rear axle for the pitching modal direction, $\alpha_{FA\text{-}ROLL}$ is the division factor for the front axle for the rolling modal direction, and $\alpha_{RA\text{-}ROLL}$ is the division factor for the rear axle for the rolling modal direction.

8. The method as claimed in claim 1, wherein the damping forces, which are divided between the front axle and the rear axle, are also divided approximately halfway between the shock absorbers on each axle.

9. The method as claimed in claim 1, wherein the at least one division factor is calculated in a continuously updated fashion, and the division of the respective damping force is adjusted in a continuously updated fashion on a basis of the at least one division factor.

10. A method for adjusting a damping force of shock absorbers connected between a vehicle body and a wheel at vehicle corners of a motor vehicle, comprising the steps of:
determining at least one damping force ($F_{LIFT}$, $F_{PITCH}$, $F_{ROLL}$), which is referred to a center of gravity of the vehicle body and is divided between axles of the motor vehicle and between shock absorbers of the axles as a function of at least one variable which represents a movement of the vehicle body or a movement of the respective wheel, calculating, for at least one of the damping forces which are referred to the center of gravity of the vehicle body, at least one division factor for the division of said damping forces between a front axle and a rear axle of the motor vehicle, and adjusting the division of the respective damping force ($F_{LIFT}$, $F_{PITCH}$, $F_{ROLL}$) on the basis of the at least one division factor, wherein, for all the damping forces referred to the center of gravity of the vehicle body, of lifting, pitching and rolling modal directions ($F_{LIFT}$, $F_{PITCH}$, $F_{ROLL}$), the method further comprises, in each case, calculating at least one division factor for the division of the respective damping force between the front axle and the rear axle, and adjusting the division of each damping force ($F_{LIFT}$, $F_{PITCH}$, $F_{ROLL}$) on the basis of the division factor, and wherein the or each division factor for the rolling modal direction is calculated as a function of a rolling spring stiffness of the front axle, a rolling spring stiffness of the rear axle, a rolling moment of mass inertia which loads the front axle and a rolling moment of mass inertia which loads the rear axle.

11. The method as claimed in claim 10, wherein division factors for the rolling modal direction are calculated as follows:

$$\alpha_{FA\text{-}ROLL} = \frac{\sqrt{c_{FA\text{-}ROLL} J_{FA\text{-}ROLL}}}{\sqrt{c_{FA\text{-}ROLL} J_{FA\text{-}ROLL}} + \sqrt{c_{RA\text{-}ROLL} J_{RA\text{-}ROLL}}},$$

$$\alpha_{RA\text{-}ROLL} = \frac{\sqrt{c_{RA\text{-}ROLL} J_{RA\text{-}ROLL}}}{\sqrt{c_{FA\text{-}ROLL} J_{FA\text{-}ROLL}} + \sqrt{c_{RA\text{-}ROLL} J_{RA\text{-}ROLL}}},$$

where $\alpha_{FA\text{-}ROLL}$ is the division factor for the front axle for the rolling modal direction, $\alpha_{RA\text{-}ROLL}$ is the division factor for the rear axle for the rolling modal direction, $C_{FA\text{-}ROLL}$ is the rolling-spring stiffness of the front axle, $C_{RA\text{-}ROLL}$ is the rolling-spring stiffness of the rear axle, $J_{FA\text{-}ROLL}$ is the rolling moment of mass inertia which loads the front axle, and $J_{RA\text{-}ROLL}$ is the rolling moment of mass inertia which loads the rear axle.

12. A control device for adjusting a damping force of shock absorbers which are connected between a vehicle body and a respective wheel at vehicle corners of a motor vehicle, wherein said control device is configured to:
determine at least one damping force ($F_{LIFT}$, $F_{PITCH}$, $F_{ROLL}$), which is referred to a center of gravity of the vehicle body and is divided between axles of the motor vehicle and between shock absorbers of the axles as a function of at least one variable which represents a movement of the vehicle body or a movement of the respective wheel, calculate, for at least one of the damping forces which are referred to the center of gravity of the vehicle body, at least one division factor for the division of said damping forces between a front axle and a rear axle of the motor vehicle, wherein the at least one division factor is calculated as a function of a lifting-spring stiffness of the front axle, a lifting-spring stiffness of the rear axle, a mass which loads the front axle and a mass which loads the rear axle, and adjust the division of the respective damping force ($F_{LIFT}$, $F_{PITCH}$, $F_{ROLL}$) on the basis of the at least one division factor.

* * * * *